Patented May 26, 1936

2,042,038

UNITED STATES PATENT OFFICE 2,042,038

PLASTIC COMPOSITION

Robert I. Colmar, Port Neches, Tex., assignor to The Texas Company, New York, N. Y., a corporation of Delaware No Drawing. Application August 10, 1933, Serial No. 684,560

3 Claims. (Cl. 106—31)

This invention relates to an improved process of forming stable asphalt emulsions, and the product resulting therefrom, wherein the emulsion is rendered particularly stable for coating difficult types of aggregate.

It has been found that if a limited quantity of a water soluble fluoride, for example sodium fluoride, is supplied to a preformed asphalt emulsion, there is a substantial increase in the effectiveness of the dispersion for coating aggregate. The soluble fluoride may be added directly to the emulsion, provided the quantity is not so excessive as to cause the emulsion to break, or it may be supplied in a water solution to the aggregate to be coated.

The effectiveness of the water soluble fluorides over other other salts such as carbonates, oxalates, sulphates, etc., is believed to reside in the property of the fluoride to form gelatinous precipitates with water soluble calcium salts, rather than fine powdery precipitates as is the case with the salts mentioned above.

The following are given as specific examples of methods of carrying out the process. An asphalt emulsion may be formed comprising approximately 72% melt and 28% water, the melt containing 95% asphalt and 5% crude Montan wax. The water into which the melt is dispersed contains .4% sodium hydroxide.

After the dispersion is formed and has been allowed to cool to normal temperatures, various quantities of water soluble fluoride solutions of different concentrations are added to the above relatively thick dispersion. Concentrations of sodium fluoride of from .10% to .40% may be added in such quantity of water as to increase the water content of the dispersion up to 42%. The concentration of the fluoride solution, as stated herein, is based on the weight of anhydrous fluoride used, compared with the total weight of the diluted dispersion. When the fluoride concentration is increased up to .25%, the dispersion gradually becomes more stable but remains quite fluid. This stability is increased as the strength of the fluoride solution is increased, although there is an increase in viscosity when the strength of the fluoride solution exceeds .25%. The emulsion remains fluid, however, up to concentration of approximately .40% sodium fluoride in the stabilizing solution. For the higher concentrations the diluted dispersions assume a gell-like structure which is more or less viscous but particularly valuable in that it possesses valuable trowelling characteristics so that it can be applied in thick layers with a minimum of effort. For many dispersions, if the concentration of the stabilizing solution is increased materially above .4% strength, the emulsion breaks and becomes valueless.

One important advantage of the emulsion, incidental to the increased stability of the treated emulsion, is that on an N/10 $CaCl_2$ demulsibility test, as applied commercially, the demulsibility can be effectively controlled by merely utilizing selected quantities of the soluble fluoride for treating the emulsion. In the first example given above, wherein the treating solution is applied to the preformed emulsion, concentrations of sodium fluoride of about .25% reduce the demulsibility on the N/10 $CaCl_2$ test to a negligible factor.

In the above example the stabilizing solution was added directly to the emulsion. It is feasible to add the treating solution to the aggregate instead. This may be accomplished by dampening the aggregate with a solution of a soluble fluoride in water and thereafter, or at the same time, adding the emulsion and mixing until the aggregate is completely coated. Under these conditions higher concentration of the fluoride solution is permissible up to approximately 3%.

As an example of the pretreatment of aggregate in accordance with the invention, a quantity of relatively difficult stone aggregate is mixed with 15 pounds of .5% solution of sodium fluoride in water (based on the quantity of the dispersion). 35 pounds of a relatively thick emulsion, containing about 32% water, is added and the mixture stirred. After a few minutes of stirring, the aggregate will be completely coated and in satisfactory condition for use. The same quantity of 1% and 2% solutions of sodium fluoride also give satisfactory results under conditions similar to the above example. This particular stone requires a minimum of .2% anhydrous sodium fluoride (based on the weight of the emulsion) for satisfactorily pretreating stone for subsequent coating with the emulsion.

Other materials can be satisfactorily coated through the use of the present stabilizing solution, applied either to the emulsion or to the aggregate, including asbestos, slag, sand and Portland cement mixtures, as well as various types of limestone and other more difficult types of stone for coating with asphalt emulsion. For brevity, all of the above materials are referred to generally herein as aggregate.

Asbestos mastics may be prepared in accordance with the present invention by adding the treating solution to the asbestos and thereafter mixing the emulsion with the pretreated asbestos. For example, 12 pounds of asbestos may be mixed with 12 pounds of water containing .39 pounds of sodium fluoride. The resulting paste is mixed with approximately 100 pounds of a relatively dilute asphalt dispersion and stirred to a smooth consistency. Greater or less fluidity may be provided by regulating the quantity of water employed.

The quantity of the soluble fluoride (anhydrous) required under various conditions may vary from approximately 0.10% to 1.5%, based on the total emulsion, where the fluoride is supplied directly to the emulsion. Where the treating solution is to be supplied to the aggregate, the quantity of the fluoride may vary from approximately 0.10% to 3.00%, on the same basis.

The desirable concentration of the stabilizing solution may vary to some extent dependent upon the type of asphalt used and the quantity and type of stabilizing material initially employed in the formation of the dispersion. The concentration and quantity can be readily determined by experiments on a small scale, after which a larger batch of the dispersion may be stabilized. For this reason, the exact proportions of materials, stated herein, are not to be considered as conclusive.

Due to the substantial increase in the stability of the treated emulsion, whether supplied directly to the emulsion or to the aggregate being treated, it will be understood that the quantity of the initial stabilizing material for the asphalt emulsion may be substantially reduced without undesirably affecting the stability of the dispersion as used.

The types of fluoride which are satisfactory for the purposes of the present invention are those which are soluble in water. The material preferred at present is sodium fluoride (NaF), although amomnium fluoride, potassium fluoride, etc. can be satisfactorily employed.

Various types of emulsion may be stabilized by the fluoride solution. Thus, in the example given above, asphalt and Montan wax emulsions dispersed in alkaline aqueous solutions respond to the specified treatment. Similarly, emulsions of asphalt and stearin pitch or rosin and similar stabilizing materials are within the contemplation of the present invention.

Obviously many modifications and variations of the invention, as hereinbefore set forth, may be made without departing from the spirit and scope thereof, and therefore only such limitations should be imposed as are indicated in the appended claims.

I claim:

1. A composition of matter comprising a homogeneous mixture of asbestos, a water soluble fluoride and stabilized asphalt emulsion, said fluoride being in the proportion of approximately .39% of the quantity of said asphalt emulsion.

2. A composition of matter comprising a homogeneous mixture of asbestos, an alkali fluoride and stabilized asphalt emulsion, said fluoride being present in the proportion of from 0.10% to 3.0% of the quantity of said asphalt emulsion.

3. The method of forming an asbestos mastic comprising adding to asbestos a water solution containing from 0.10% to 3.0% of a water soluble fluoride, and mixing therewith a substantial proportion of a preformed asphalt emulsion.

ROBERT I. COLMAR.